United States Patent [19]
Hartwick et al.

[11] 3,928,816
[45] Dec. 23, 1975

[54] FAR INFRARED WAVEGUIDE LASER

[75] Inventors: Thomas S. Hartwick, Torrance; Dean T. Hodges, Jr., Redondo Beach, both of Calif.

[73] Assignee: The United States of America as represented by the Secretary of the Air Force, Washington, D.C.

[22] Filed: June 12, 1974

[21] Appl. No.: 478,501

[52] U.S. Cl. .................... 331/94.5 C; 331/94.5 G
[51] Int. Cl.² ............................................ H01S 3/08
[58] Field of Search ................................... 331/94.5

[56] References Cited

UNITED STATES PATENTS

| | | | |
|---|---|---|---|
| 3,493,892 | 2/1970 | Witteman et al. | 331/94.5 G |
| 3,628,174 | 12/1971 | Bridges et al. | 331/94.5 G |

*Primary Examiner*—William L. Sikes
*Attorney, Agent, or Firm*—Joseph E. Rusz; George Fine

[57] ABSTRACT

A far infrared (FIR) laser is provided which uses a dielectric or metal tube waveguide resonator. A $CO_2$ or CO waveguide laser is utilized to pump the FIR laser.

6 Claims, 3 Drawing Figures

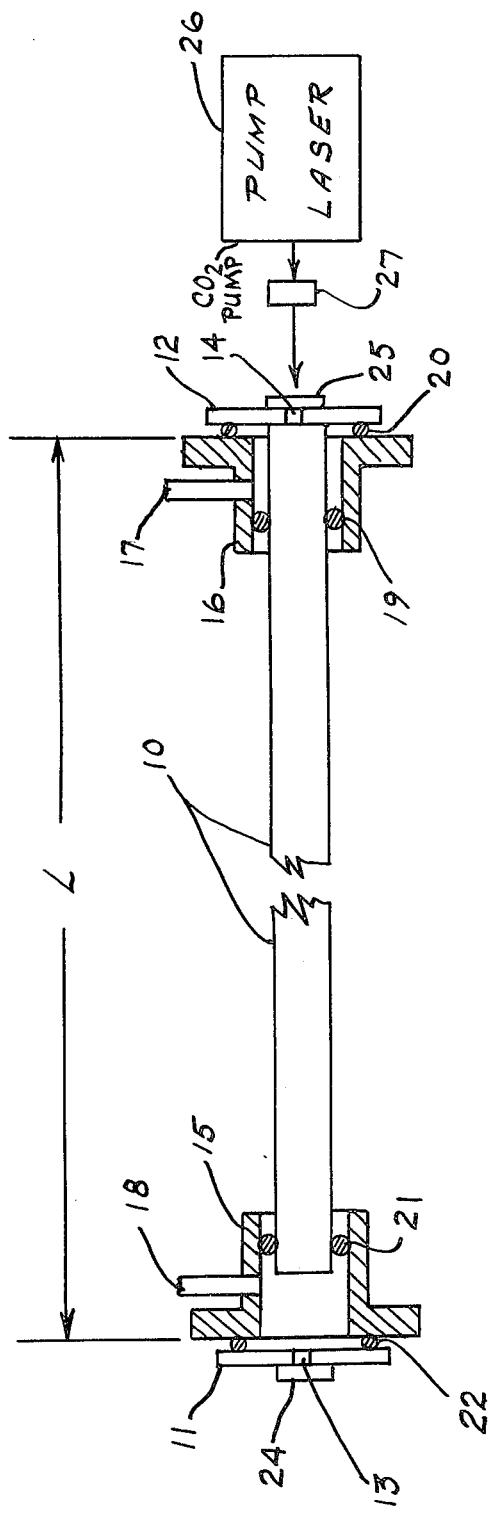

FAR INFRARED WAVEGUIDE LASER

BACKGROUND OF THE INVENTION

There are two types of lasers which emit CW radiation in the far infrared (FIR) spectral region which extends over the wavelength spread from ~ 50 $\mu$m to ~ 1000 $\mu$m. The first type of laser is electrically excited and is characterized by low gain (a few percent per meter) and low efficiency ($< 10^{-3}$ percent). A great deal of research has been performed on this type of laser over the past 5 years and little improvement is anticipated. The second type of laser is optically excited by a $CO_2$ laser and is much newer; little research work has been performed on this laser which was discovered about three years ago. This type of laser exhibits very high gain (greater than 100 percent per meter). Both the electrically excited and laser pumped lasers have been constructed in a similar fashion. A conventional optical beam mode resonator (Fabry-Perot) is used in combination with the active medium. The beam mode resonator is like that employed in all lasers and the dimensions scale with wavelength and become several inches in lateral size in the FIR region. The result is a large laser device and this is one of the problems which the present invention solves. There has been constructed a compact optically pumped FIR laser using a novel resonator configuration.

In accordance with the invention a dielectric or metal tube waveguide resonator is used in a laser pumped FIR laser and the advantages of this construction are many. First, this invention reduces the lateral dimension from several inches to less than an inch. A very compact laser is the result when coupled with a compact waveguide $CO_2$ laser source for excitation. Second, through a reduction in the lateral dimension a more efficient overlap of the pumping $CO_2$ radiation with the FIR resonator mode is achieved; this will likely lead to a higher efficiency FIR laser. Third, the metal tubes lead to a more rigid stronger construction. Fourth, several modes of the metal tube resonator can be excited to produce desirable FIR radiation patterns. Fifth, the compact construction and the use of waveguides permit the elimination of long tubes resulting in compact structure. Sixth, metal waveguides compatible with the source geometry can be effectively employed to conduct the laser radiation to any desired location.

SUMMARY OF THE INVENTION

The far infrared laser utilizes a waveguide resonator. The waveguide resonator may be constructed of dielectric or metallic material. The FIR resonators may be comprised of either 9 mm ID quartz tubing or 10 mm ID brass tubing located between two flat gold-coated metal mirrors. For a typical mirror separation of 70 cm, a Fresnel number of less than 1.0 suggests that a guided wave propagation description is accurate. One mirror is in contact with the end of the guide tubing; the other mirror is located ~ 2.5 cm from the waveguide tube and could be translated on a driven translation stage to tune the resonator. All the dimensions of the resonator assembly are typically an order of magnitude smaller than those of a conventional electrical discharge FIR laser.

The FIR laser medium is $CH_3OH$ and is excited by the absorption of various laser lines in the 9.6 $\mu$m band of $CO_2$. $CH_3OH$ is an excellent FIR laser medium because of a rich FIR laser spectrum and a low threshold for CW operation. Chopped CW pump radiation is focused through one mirror with a 20 cm F. L. $BaF_2$ lens and the FIR laser output is monitored at the opposite mirror with a Ga:Ge detector. Oscillation was observed on several $CH_3OH$ rotational-rotational transitions in the 40 $\mu$m and 200 $\mu$m wavelength region, the region of detector coverage. Threshold $CO_2$ pump powers were typically 0.5 watt into the FIR cavity, and up to the highest pump levels available (3–4 watts), the FIR output was found to vary linearly with pump power. At the pressure optimum (1 Torr) for maximum input power (4 watts), FIR power levels of greater than 1 milliwatt (single end) have been measured at 70.6 and 118.8 $\mu$m. These power levels are greater than those which we have achieved with a conventional resonator laser pumped FIR of the same length as the waveguide resonators.

DESCRIPTION OF THE DRAWINGS

FIG. 1 shows a schematic of the FIR waveguide laser; and

DETAILED DESCRIPTION OF THE PREFERRED EMBODIMENT

Figure 2A:
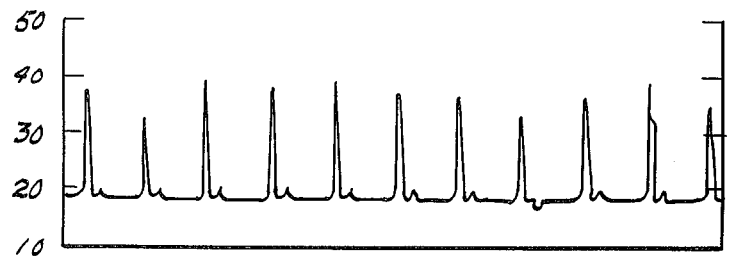
FIG. 2a and FIG. 2b show relative output powers scans at 118 $\mu$m as a function of cavity length for a 9 mm ID quartz waveguide and 10 mm ID gold-coated brass waveguide, respectively.

Now referring in detail to FIG. 1, there is shown a dielectric waveguide resonator constructed from 9 mm ID (inner diameter) 70 cm long hollow quartz tubing 10 located between two flat gold-coated mirrors 11 and 12. In place of the quartz tubing, there may be utilized a 10 mm ID hollow brass tubing. Coupling holes 13 and 14 2.5 mm in diameter were drilled in each mirror. The mirrors are positioned such that coupling holes are opposed and located radially between the cylinder axis and the quartz tubing inner wall. Mirror 12 contacts one end of quartz tubing 10; mirror 11 is located ~ 2.5 cm from the other end of quartz tubing 10 and can be made, if desired, to be translated on a driver translation stage to tune the resonator. Housings 15 and 16 are utilized to support quartz tube 10 and they include gas ports 17 and 18. It is noted that an optimum pressure is about 1 Torr. O ring seals 19 and 20 are included in housing 15 and O ring seals 21 and 22 in housing 15 for properly sealing the resonator. Crystalline quartz IR (infrared) window 24 is affixed to mirror 11 and IR crystalline quartz window 25 to mirror 12 to completely seal the waveguide resonator. The entire resonator assembly is placed within a vacuum chamber. It is emphasized that no critical alignment procedures are necessary or are used nor is precision machine work required. The quartz tubing is commercial grade tubing which may be manually straightened in a glass lathe. Laser operation is easily achieved.

Figure 2B:
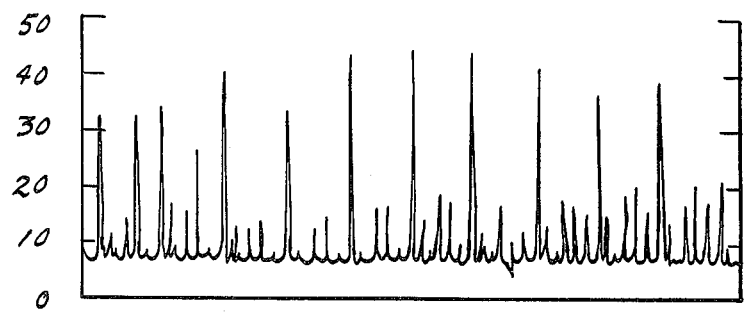

The FIR laser medium, in one instance, was $CH_3OH$ excited by absorption of various laser lines in the 9.6 $\mu$m band of $CO_2$. Chopped CW $CO_2$ pump radiation from pump laser 26 is focused through mirror 25 by 20 cm F. L. $BaF_2$ lens 27 and the FIR laser radiation from the FIR laser of the present invention may be monitored at opposite mirror 24 with Ga:Ge detector 28. Oscillation was observed on several $CH_3OH$ rotational-rotational transitions in the 70 $\mu$m to 200 $\mu$m wavelength region, the region of detector coverage. Threshold pump powers are typically 0.5 watt into the FIR cavity, and up to the highest pump levels available (3–4 watts), the FIR output power varied linearly with pump power. Power levels of the order of 1 milliwatt (single end) have been measured at 70.6 and 118.8 μm. The output power variation with mirror translation for the laser pumped dielectric and metallic waveguide FIR lasers exhibit several peaks as shown in FIG. 2a and FIG. 2b, respectively. For the conventional resonator, a cavity aperture was used to limit oscillation to a few low order transverse modes. No more than two low order transverse modes could be observed for the 9 mm ID dielectric waveguide FIR laser. In contrast, the 10 mm ID metallic waveguide FIR laser exhibits several transverse modes. To the extent that the resonator modes are approximated by normal modes of the waveguide, two main loss contributions, the propagation loss and the coupling loss, determine the total resonator loss. Resistive losses in the metallic waveguide walls determine the propagation losses and radiative losses dominate the dielectric tube propagation loss. Computations show that between 1 mm and 100 μm at least 7 modes of the metallic waveguide class $TE_{1m}$ have a loss less than $4 \cdot 10^{-2} \, m^{-1}$. Many other metallic waveguide modes, including the low loss circular mode class $TE_{0g}$, similarly exhibit a low propagation loss. Dielectric tube modes propagate with losses somewhat larger than 1 percent for the indicated geometry. The round trip coupling loss from the waveguide to the mirror and back, dominates the overall resonator loss for the metallic waveguide modes. The $TE_{11}$ mode electric field is linearly polarized to a good approximation and has a $J_0(K)$ Bessel function radial ($p$) dependence across the waveguide aperture like the $EH_{11}$ mode, but differing by the constant K. The $TE_{11}$ mode electric field is finite at the boundary instead of zero as for the $EH_{11}$ mode. One might anticipate low coupling losses for the $TE_{11}$ mode, and several metallic waveguide modes can be excited as seen in FIGS. 2a and 2b. Also, the number of modes excited increases enormously as the mirrors are moved closer to the end of the metallic waveguide. It appears that the coupling loss is decreased and, in combination with the low propagation losses, a number of modes achieve threshold.

For the electrical discharge $CO_2$ laser, narrowing of the bore with the waveguide construction results in increases in gain per unit length, power output per unit volume, and saturation parameter. These benefits result from favorable effects of the narrow bore on the discharge plasma. Similar behavior occurs for the FIR waveguide laser, but for different reasons. Efficient coupling of the pump laser to the laser medium is crucial to the operation of the FIR laser pumped laser. It has been observed that higher pressures can be tolerated in the waveguide than in the conventional resonator. In the FIR waveguide structure, the smaller resonator mode volume can be excited by a higher intensity pump beam, hence higher pressures (with the attendant higher rotational-rotational deactivation rates) can be tolerated.

It is emphasized that the waveguide laser is easily employed in the FIR spectral region. The laser pumped FIR laser exhibits high gain and does not require an electrical discharge; these properties simplify the waveguide laser construction and admit the use of metallic guides. With the waveguide laser, the size of FIR lasers has been greatly reduced. The use of a waveguide $CO_2$ or CO laser to pump a FIR laser is also desirable as it provides an improved compactness and convenience.

What is claimed is:

1. A far infrared laser being comprised of a hollow waveguide resonator of preselected length and inner diameter in accordance with the infrared wavelength in the region from 50 μm to ~ 1000 μm and having first and second ends, a first and second mirror for said first and second ends, each of said mirrors having a hole of preselected dimension therein, first and second windows sealing said holes in said first and second mirrors, respectively, said first window and said first mirror, in first combination sealing said first end, said second window and said second mirror, in second combination, sealing said second end, a preselected active laser medium in said hollow waveguide resonator, means to establish a preselected pressure in said hollow waveguide resonator, and laser pump means to optically excite said preselected active laser medium by way of said first combination to provide output radiation by way of said second combination.

2. A far infrared laser as described in claim 1 wherein said hollow waveguide resonator consists of a preselected dielectric material, said preselected length being 70 cm and said preselected inner diameter being 9 mm.

3. A far infrared laser as described in claim 1 wherein said hollow waveguide resonator consists of a preselected metallic material, said preselected length being 70 cm and said preselected inner diameter being 10 mm.

4. A far infrared laser as described in claim 1 wherein said preselected active laser medium is comprised of $CH_3OH$ and said hollow waveguide resonator consists of gold-coated brass material, said preselected length and inner diameter thereof being 70 cm and 10 mm, respectively.

5. A far infrared laser as described in claim 4 wherein said first and second windows are comprised of quartz, said holes therethrough having a preselected dimension of 2.5 mm.

6. A far infrared laser as described in claim 5 wherein said laser pump means is comprised of a $CO_2$ waveguide laser with the power output of said far infrared laser varying linearly with the laser pump power.

* * * * *